United States Patent [19]

Lawther et al.

[11] Patent Number: 5,285,227
[45] Date of Patent: Feb. 8, 1994

[54] PHOTOGRAPHIC CAMERA AND FILM CARTRIDGE WITH DOUBLE EXPOSURE PREVENTION

[75] Inventors: Joel S. Lawther; Russell J. Cope, Jr., both of Rochester, N.Y.

[73] Assignee: Eastman Kodak Company, Rochester, N.Y.

[21] Appl. No.: 33,665

[22] Filed: Mar. 16, 1993

[51] Int. Cl.$^5$ .............................................. G03B 17/26
[52] U.S. Cl. ..................... 354/275; 354/21; 354/207; 354/174
[58] Field of Search ................... 354/21, 207, 275, 174

[56] References Cited

U.S. PATENT DOCUMENTS

| | | | |
|---|---|---|---|
| 4,894,673 | 1/1990 | Beach | 354/275 |
| 5,030,978 | 7/1991 | Stoneham et al. | 354/21 |
| 5,032,854 | 7/1991 | Smart et al. | 354/21 |
| 5,047,794 | 9/1991 | Pagano et al. | 354/275 |
| 5,115,268 | 5/1992 | Kitagawa et al. | 354/275 |
| 5,159,365 | 10/1992 | Takahashi et al. | 354/275 |
| 5,229,803 | 7/1993 | Pagano et al. | 354/275 |
| 5,234,175 | 8/1993 | Pagano | 354/275 |

Primary Examiner—Monroe H. Hayes
Attorney, Agent, or Firm—Francis H. Boos, Jr.

[57] ABSTRACT

A photographic film cartridge has a word imprinted on the exterior surface of the cartridge visually indicating exposure status of film in the cartridge. A thermally responsive coating of a phase change medium overlies a portion of the word such that when the medium is rendered opaque, the word meaning is changed to indicate that the film is in an exposed state. The camera is provided with a heat generating element that is activated when images are exposed onto the film to render the phase change medium opaque. The camera is also provided with an opto-sensor and control means responsive to the phase change medium to allow loading of the film when the medium is in its unchanged condition and to prevent loading of the film when the phase change medium is changed to indicate exposed film in the cartridge.

9 Claims, 2 Drawing Sheets

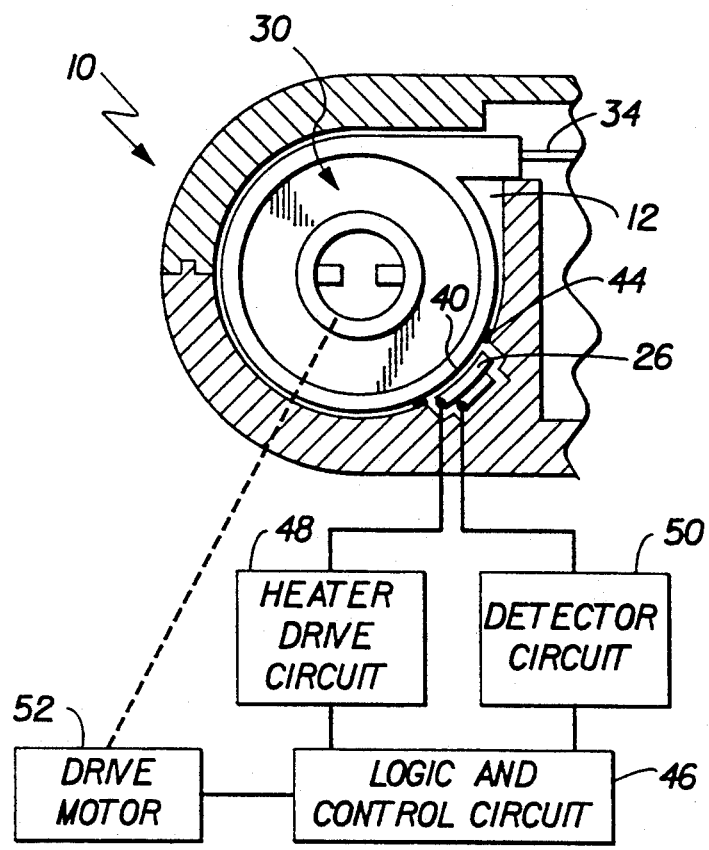
FIG. 3
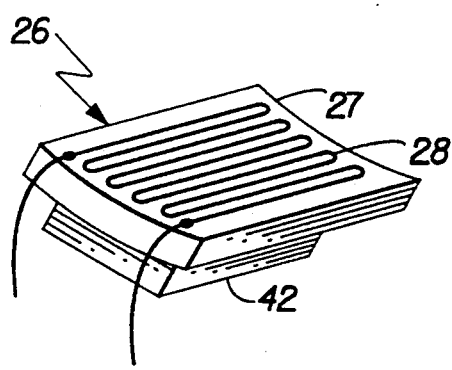
FIG. 4

PHOTOGRAPHIC CAMERA AND FILM CARTRIDGE WITH DOUBLE EXPOSURE PREVENTION

FIELD OF INVENTION

This invention relates to the field of photographic film cameras and film cartridges therefor with provision for double exposure prevention.

BACKGROUND

Conventional 35mm film cartridges are normally sold with a portion of the film leader projecting from the exit slot of the cartridge. This allows the camera user to grasp and pull the film for loading in the camera and at the same time provides a visual indication to the camera user that the film in the cartridge is unexposed. Upon rewind, the film is rewound completely into the cartridge and the absence of the protruding leader indicates that the film has been exposed and prevents reuse of the film in a camera thus inherently providing protection against double exposure of the film. Recently, camera and film cartridge designs have been proposed in which the film is totally enclosed in the cartridge when sold. To load the film, the cartridge is inserted and the drive motor operates to thrust the film out of the cartridge to the film take-up spool. Upon rewind, the film is drawn entirely into the cartridge. As a consequence, there is no visual indication to distinguish between an exposed and an unexposed film roll and, thus, numerous camera and cartridge designs have been proposed to provide protection against re-use and double exposure of the film.

It is known, for example, to provide cartridges with mechanical features that cooperate with feelers in the camera that prevent insertion of cartridges into the camera when the film has previously been exposed. In many cases these mechanical features also provide a visual indication of the exposed condition of the film. A representative example of an arrangement providing both visible indication and mechanical lockout means is found in commonly assigned U.S. Pat. No. 5,047,794. U.S. Pat. No. 5,115,268 discloses a mechanical slide on the film cartridge is movable by a cam arrangement upon insertion into the camera to cover the letters UN in the word UNEXPOSED printed on the end of the cartridge to provide a visible indication of an exposed condition of the film in the cartridge. In commonly assigned U.S. Pat. Nos. 5,032,854 and 5,030,978, a radial bar coded disc on the end of a film cartridge is sensed by an opto-sensor in the camera to position the film spool upon conclusion of rewind at a selected one of plural visual indicators that indicate the exposure condition of film in the camera.

Such arrangements however, require special cartridge designs that add to the cost and complexity of cartridge manufacture. In the case of cartridges with just visual indicators, it is possible to ignore the indicators and load the film into the camera thereby creating a possibility of double exposure of the film.

It is therefore an object of the invention to provide a simple, inexpensive cartridge and camera configuration that provides both a visual indication of the exposure condition of photographic film that also provides the capability of automatically preventing loading of exposed film into the camera thereby avoiding the possibility of double exposing the film in the camera.

SUMMARY OF THE INVENTION

In accordance with one aspect of the invention, a photographic film cartridge is provided having a housing with an outer surface and which comprises a coating of a thermally responsive phase change medium in a predetermined region on the outer surface of the film cartridge whereby activation of the phase change medium creates an indicium representing an exposed condition of film in the cartridge. In one embodiment, the word "unexposed" is printed on the side of the cartridge and the region of phase change medium overlies the letters "un". When activated by a suitably equipped camera, the phase change medium becomes opaque and obliterates the letters "un" leaving the word "exposed".

In accordance with a further aspect of the invention, a double exposure prevention apparatus for a photographic camera is provided which comprises a heat generator so positioned in the camera as to be in heat transfer relationship with a thermally responsive phase change medium located in a predetermined region on the surface of a film cartridge placed in the camera, for example, overlying the letters "un" in the word "unexposed" printed on the outer surface of the film cartridge. The apparatus further comprises control means for activating the heat generator when at least one image frame has been exposed on film from the cartridge to create an indicium on said phase change medium to visually indicate that the film in the cartridge has been exposed. In a preferred embodiment, the indicium is an opaque region that obliterates the letters "un". In a still further aspect of the invention, the apparatus further comprises an opto-sensor aligned with the phase change region on the cartridge and which is responsive to the phase change indicium to prevent loading of the film into the camera when the indicium is such as to represent an exposed condition of the film in the cartridge.

Such an arrangement of the camera and the cartridge has the advantage being a simple, low cost double exposure prevention arrangement that does not involve costly mechanical features in the cartridge and camera and that simultaneously provides both a visual exposure indication and automatic prevention of loading of exposed film into the camera.

BRIEF DESCRIPTION OF THE DRAWINGS

In the drawings:

FIG. 3 is a schematic illustration of a portion of camera and related circuits constructed according to the invention.

FIG. 4 is a perspective illustration of a heat generating element and opto-sensor useful in the present invention.

FIGS. 5a and 5b are graphical illustrations of indicia useful on film cartridges in carrying out the present invention.

DETAILED DESCRIPTION

Figure 1:
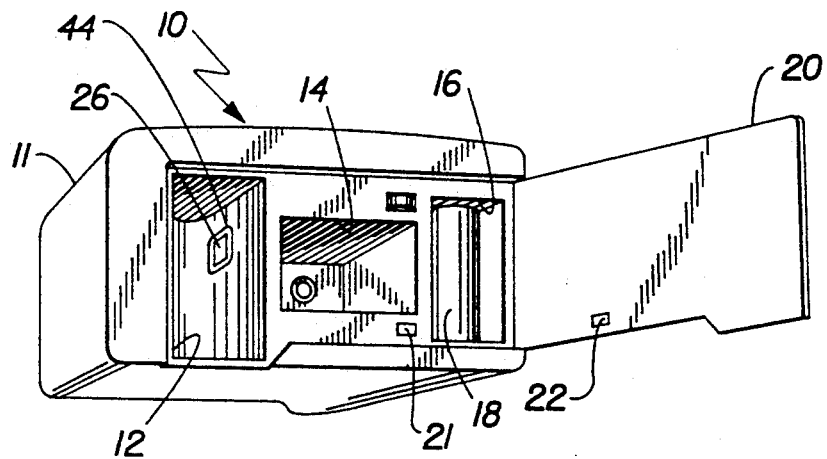
FIG. 1 is a perspective view of a photographic camera according to the invention.

Referring now to FIG. 1, a camera 10 in which the present invention is embodied is comprised of a camera body 11 and a hinged back cover 20. Camera body 11 is conventionally provided with a film cartridge receiving chamber 12, a film frame exposure aperture 14, film take-up chamber 16 and film take-up spool 18. Perforation sensing means for film metering in the camera may comprise a light emitting LED 21 mounted in the camera body 11 adjacent exposure aperture 14 and a light sensor 22 mounted on camera back 20 such that when back 20 is closed sensor 22 is aligned with LED 21. A film drive motor (not shown) is mounted within camera body 11 and drives take-up spool 18 to advance a film strip through the camera thereby to position successive image frame areas over the exposure aperture 14. In accordance with a feature of the invention, the camera includes a heat generator element 26 so positioned in the cartridge receiving chamber as to be in heat transfer relationship with a thermally responsive phase change medium formed in a predetermined region on the exterior surface of a film cartridge when the cartridge is inserted into the chamber.

Figure 2:
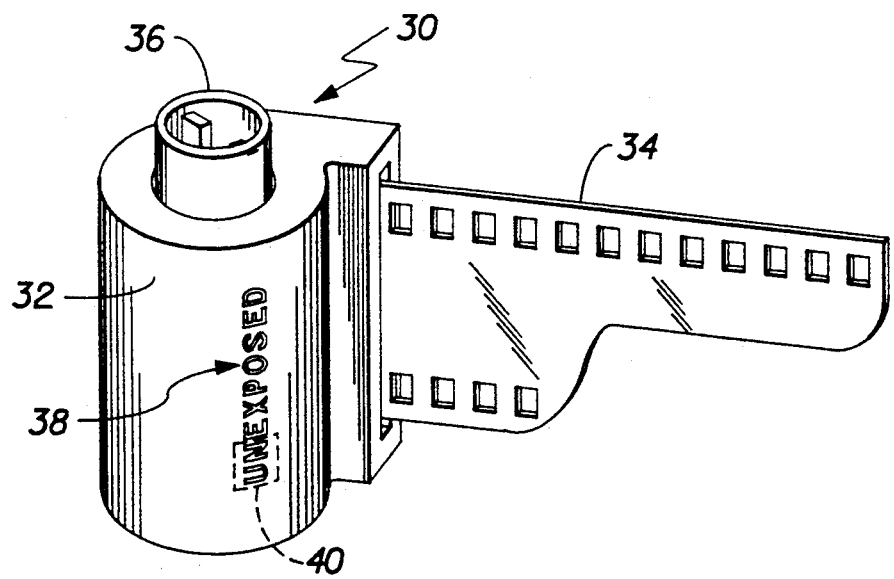
FIG. 2 is a perspective view of a film cartridge embodying one aspect of the present invention.

Referring to FIG. 2, there is shown a film cartridge 30 comprising a generally cylindrical housing 32 enclosing a roll of film 34 wound on an internal spool having an end drive spindle 36 extending out one end of the cartridge. In accordance with a particular feature of the invention, the cartridge includes indicia in the form of a set of alpha-characters forming word "UNEXPOSED" imprinted on the exterior surface of the cartridge. A coating of a virtually transparent, thermally responsive phase change medium is provided at least in a predetermined region 40 overlying a portion of the word "UNEXPOSED", in this case over the letters "UN" as seen in FIGS. 2 and 5a. The phase change medium may be any well known material for this purpose, an example of which is the coating used on thermally responsive facsimile paper.

Referring to FIG. 3, film cartridge 30 is shown installed in the cartridge receiving chamber 12 of camera 10 with the region 40 of phase change medium pressed against heat generator element 26. As seen in FIG. 4, heat generator element 26 may comprises a substrate 27 on which is formed a thin-film resistive heater grid 28. The grid 28 and substrate 27 are preferably transparent or slightly translucent. Also, preferably, the heat generating element 26 is formed with a slight curvature or is flexible in nature so as to conform to the curvature of the film cartridge 30 for optimum heat transfer to the phase change medium on the cartridge surface. Mounted behind the heat generating element is an opto-sensor 42 so positioned as to be responsive to reflectivity of the region of phase change medium on the cartridge surface. As is well known, an opto-sensor includes a small light source and a photosensor that generates an electrical output in response to light from the light source reflected from a surface being irradiated by the light source. In order to assure that light from the light source in the opto-sensor does not fog the film in the camera, a frame 44 of compressible, light blocking material may be formed about the recess in which the heat generating element 26 is mounted.

Referring again to FIG. 3, camera 10 further includes a logic and control circuit 46 coupled through a heater drive circuit 48 to the heat generating element 26. The logic and control circuit 46 is suitably programmed to activate the heat generating element when at least one image frame has been exposed in the camera and preferably when all the image frames on the film roll 34 are exposed to create an indicium on the phase change medium to visually indicate that the film in the cartridge is exposed. Additionally, the logic and control circuit 46 is programmed to be responsive to the opto-sensor output through opto-sensor detector circuit 50 to prevent the operation of the drive motor 52 so as to prevent loading of film into the camera when the opaque indicium 40a (FIG. 5b) is sensed by the opto-sensor on cartridge 30 inserted into the cartridge receiving chamber 12.

In operation, when a fresh cartridge 30 of unexposed film and bearing the word "UNEXPOSED" on the outer surface of the cartridge is loaded into the camera cartridge receiving chamber, the output of opto-sensor detector circuit 50 is at level that is indicative of a transparent condition of the phase change medium in the region 40. The logic and control circuit 46 responds to allow drive motor 52 to be initiated for loading of the film into the camera. When at least one, and preferably all, image frames on film roll 34 are exposed, logic and control circuit 46 activates the heater element 26 to cause the region 40 of the phase change medium to become opaque, as shown in FIG. 5b, thus providing a visual indication to the camera user that the film in the camera has been exposed thereby aiding the user to avoid reinserting the cartridge into the camera at some later time. Assuming, however, that the user inadvertently places the cartridge into the camera, the detected output of the opto-sensor is now at a second level as a result of the opaque, non-reflective condition of region 40, which causes the logic and control circuit 46 to prevent activation of the drive motor 52 thereby preventing loading of the film into the camera. Thus the opaque region of phase change medium serves not only as a visual indicator by virtue of changing the status indicator word from "UNEXPOSED" to "EXPOSED", but also serves to trigger automatic prevention of the loading of the film into the camera.

It will be appreciated from the foregoing that what is has been disclosed is a simple and reliable camera and film cartridge arrangement to both manually and automatically prevent double exposure of film that does not require costly mechanical features in the cartridge or camera design. The invention has been described in detail with particular reference to a presently preferred embodiment, but it will be understood that variations and modifications can be effected within the scope of the invention as set forth in the claims appended hereto.

In the accompanying drawings, the following reference numerals are used:

| | |
|---|---|
| 10 | camera |
| 11 | camera body |
| 12 | cartridge receiving chamber |
| 14 | film frame exposure aperture |
| 16 | film take-up chamber |
| 18 | film take-up spool |
| 20 | camera back |
| 21 | LED |
| 22 | light sensor |
| 26 | heat generating element |
| 27 | substrate |
| 28 | resistive heating grid |
| 30 | film cartridge |
| 32 | cartridge housing |
| 34 | film |
| 36 | spool end drive spindle |
| 38 | alpha characters |
| 40 | region of phase change medium coating |
| 40a | opaque indicium of exposed film condition |
| 42 | opto-sensor |
| 44 | light blocking frame |
| 46 | logic and control circuit |
| 48 | heater drive circuit |
| 50 | opto-sensor detector circuit |

| 52 | drive motor |

We claim:

1. Double exposure prevention apparatus for a photographic camera comprising:
   a heat generating element so positioned in the camera as to be in heat transfer relationship with a thermally responsive phase change medium in a predetermined region on the surface of a film cartridge placed in the camera; and
   control means for activating the heat generating element when at least one image frame has been exposed on film from said cartridge to create an indicium on said phase change medium to visually indicate said film in the cartridge has been exposed.

2. The invention of claims 1 wherein said control means is effective to activate said heat generating element after all image frames have been exposed.

3. The invention of claim 1 further including an opto-sensor so positioned in the camera as to detect the existence of said indicium in said phase change medium region.

4. The invention of claim 3 wherein said control means if further responsive to detection of said indicium to prevent loading of said film into the camera.

5. A photographic film camera comprising:
   a chamber for receiving a film cartridge having a thermally responsive phase change medium in a predetermined region on the cartridge surface;
   a heat generating element so positioned in the cartridge receiving chamber as to be in thermal contact with said region of the phase change medium when said cartridge is inserted into the chamber;
   an opto-sensor so positioned in the cartridge receiving chamber as to be responsive to reflectivity of said region of phase change medium on the cartridge; and
   control means responsive to exposure of at least one image frame on film from said cartridge to activate said heat generator to create an indicium within said region representing an exposed film condition and responsive to said opto-sensor for preventing loading of film into the camera when said indicium is sensed by said opto-sensor on a cartridge inserted into said cartridge receiving chamber.

6. The invention of claim 3 or 5 in which said cartridge bears alpha-characters adapted to visually indicate an unexposed condition of film in the cartridge and wherein said heat generating element is adapted, upon activation, to modify at least some of said alpha-characters with said indicium after exposure of film in the camera to indicate an exposed condition of the film in the cartridge.

7. The invention of claim 6 said region of phase change material is superimposed over said at least some alpha-characters and wherein said heat generating element is adapted to render said region of phase change material opaque whereby said at least some alpha-numeric characters are obliterated to change the meaning of said alpha-characters from that representing an unexposed to an exposed condition of film in the cartridge.

8. A photographic film cartridge having a housing with an outer surface and comprising:
   a coating of a thermally responsive phase change medium in a predetermined region on the outer surface of the film cartridge whereby activation of the phase change medium creates an indicium representing an exposed condition of film in the cartridge.

9. The cartridge of claim 8 further comprising a set of alpha characters on the outer surface providing visual indication representative of an unexposed condition of said film and wherein said region of phase change material overlies at least a portion of said alpha characters whereby activation of said phase change material obliterates said portion of alpha characters leaving a visual indication representative of an exposed condition of said film.

* * * * *